US011955298B2

(12) United States Patent
Huang et al.

(10) Patent No.: US 11,955,298 B2
(45) Date of Patent: Apr. 9, 2024

(54) BUTTON MODULE

(71) Applicant: ASUSTEK COMPUTER INC., Taipei (TW)

(72) Inventors: Te-Wei Huang, Taipei (TW); Zih-Siang Huang, Taipei (TW); Jhih-Wei Rao, Taipei (TW); Hung-Chieh Wu, Taipei (TW); Liang-Jen Lin, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 17/898,730

(22) Filed: Aug. 30, 2022

(65) Prior Publication Data

US 2023/0223218 A1 Jul. 13, 2023

(30) Foreign Application Priority Data

Jan. 13, 2022 (TW) .................................. 111101403

(51) Int. Cl.
*H01H 21/22* (2006.01)

(52) U.S. Cl.
CPC .................................. *H01H 21/22* (2013.01)

(58) Field of Classification Search
CPC ........ H01H 21/22; H01H 13/14; H01H 13/79; H01H 13/86; H01H 13/702; H04M 1/23
USPC .......................................................... 200/335
See application file for complete search history.

(56) References Cited

U.S. PATENT DOCUMENTS

2006/0181506 A1* 8/2006 Fyke .................... H01H 13/702
345/156
2021/0118632 A1* 4/2021 Vollkommer ...... H01H 13/7006
2021/0398756 A1* 12/2021 Nguyen ................ H04M 1/236

FOREIGN PATENT DOCUMENTS

CN 108404403 A 8/2018
CN 212277059 U 1/2021

* cited by examiner

*Primary Examiner* — Renee S Luebke
*Assistant Examiner* — Iman Malakooti
(74) *Attorney, Agent, or Firm* — MUNCY, GEISSLER, OLDS & LOWE, P.C.

(57) ABSTRACT

A button module is provided. The button module comprises a base, a pressing part, and an elastic part. The pressing part includes a fixed end and a free end. The fixed end is pivotally connected to the base in a first axial direction. The elastic part is disposed on a side of the pressing part facing the base. The elastic part includes a first damping portion and a second damping portion selectively pressing against the base, where a hardness of the first damping portion is different from a hardness of the second damping portion.

13 Claims, 13 Drawing Sheets

BUTTON MODULE

CROSS-REFERENCE TO RELATED APPLICATION

This application claims the priority benefit of Taiwan Application Serial No. 111101403, filed on Jan. 13, 2022. The entirety of the above-mentioned patent application is hereby incorporated by reference herein and made a part of the specification.

BACKGROUND OF THE INVENTION

Field of the Invention

The disclosure relates to a button module, and in particular, to a button module that provides pressing feedback.

Description of the Related Art

Multiple players acquire game experience through mobile devices. Current mobile devices often use external controllers to assist in operations, but such external controllers are not easily portable.

BRIEF SUMMARY OF THE INVENTION

The disclosure provides a button module. The button module includes a base, a pressing part, and an elastic part. The base includes a detection surface. The pressing part includes a fixed end and a free end. The fixed end is pivotally connected to the base in a first axial direction.

The elastic part is disposed on a side of the pressing part facing the base, and the elastic part includes a first damping portion and a second damping portion selectively pressing against the detection surface, where a hardness of the first damping portion is different from a hardness of the second damping portion.

The disclosure provides another button module, mounted on an electronic device. The electronic device includes a detection surface. The button module includes a base, a pressing part, and an elastic part. The base is fixed on a side of the detection surface. The pressing part includes a fixed end and a free end. The fixed end is pivotally connected to the base in a first axial direction.

The elastic part is disposed on a side of the pressing part facing the detection surface, and the elastic part includes a first damping portion and a second damping portion selectively pressing against the detection surface, where a hardness of the first damping portion is different from a hardness of the second damping portion.

The button module provided in the disclosure includes a pressing part and an elastic part. The elastic part provides a user with pressing feel feedback, and a detection surface detects applied pressure to trigger an electronic device to generate different feedback. In this way, the button module provides more impressive game experience while satisfies a portability requirement. In addition, the elastic part provided in the disclosure includes a first damping portion and a second damping portion with different hardness. A user is allowed to select the first damping portion or the second damping portion to press against the detection surface to adjust required button feedback.

DETAILED DESCRIPTION OF THE EMBODIMENTS

More detailed descriptions of the specific embodiments of the disclosure are provided below with reference to the accompanying drawings. The features and advantages of the disclosure are described more clearly according to the following description and claims. All of the drawings use very simplified forms and imprecise proportions, only being used for assisting in conveniently and clearly explaining the objective of the embodiments of the disclosure.

Figure 1A:
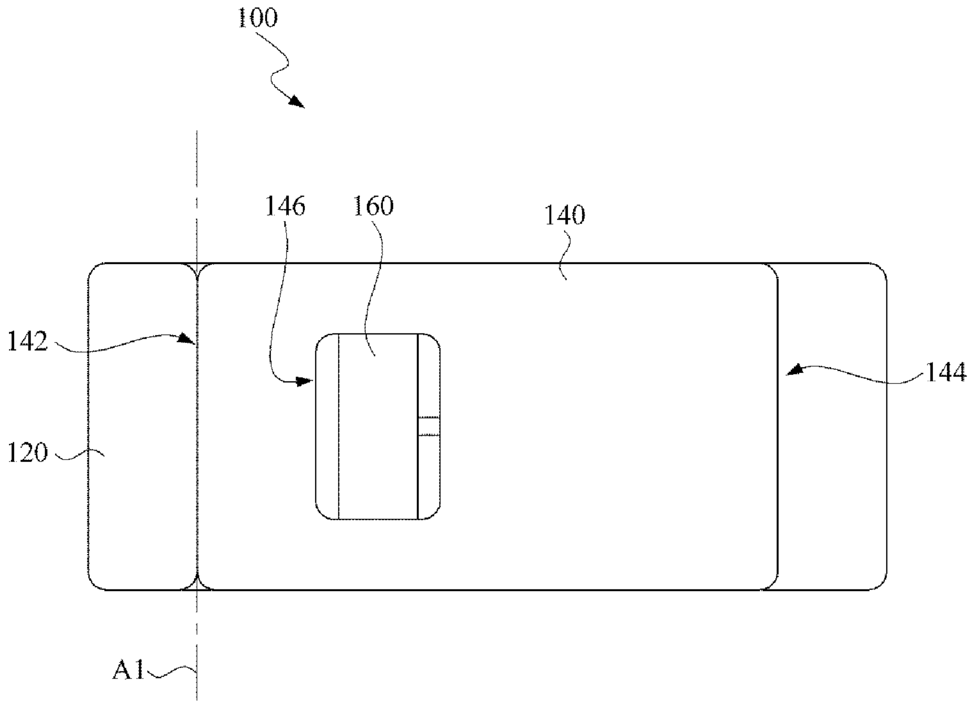
FIG. 1A to FIG. 1C show a button module according to a first embodiment of the disclosure.
Figure 1B:
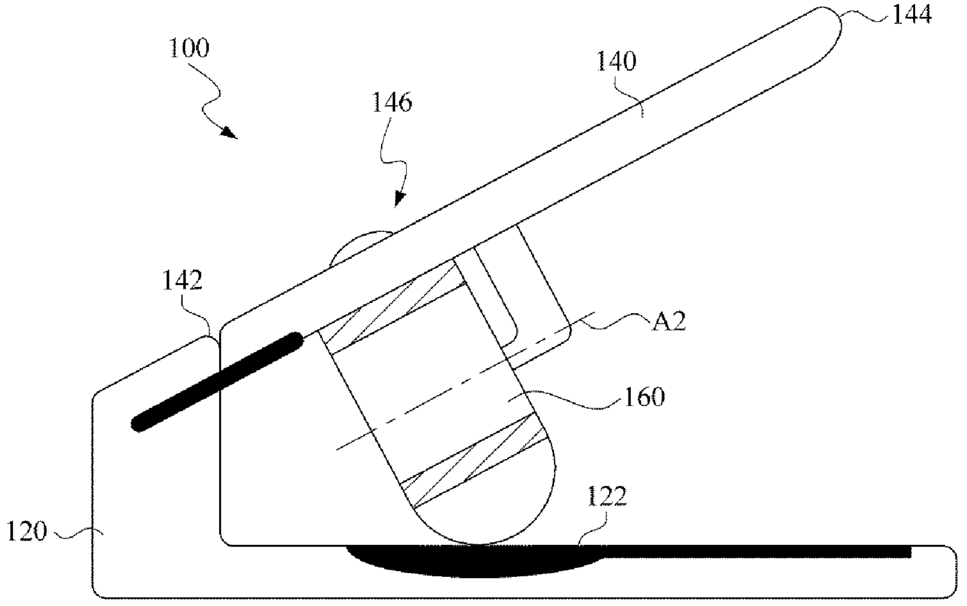
Figure 1C:
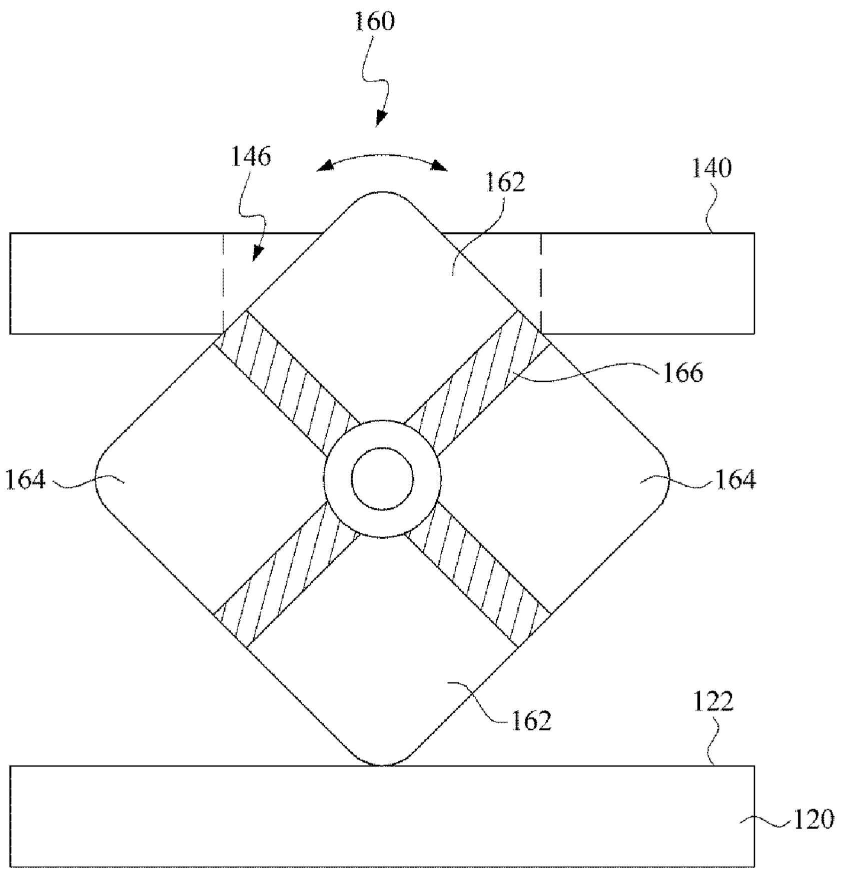

FIG. 1A to FIG. 1C show a button module according to a first embodiment of the disclosure. FIG. 1A is a schematic top view of a button module 100, FIG. 1B is a schematic side view of the button module 100, and FIG. 1C is a schematic front view of an elastic part 160 of the button module 100.

The button module 100 is mounted on an electronic device such as a smartphone or a tablet computer and fits the electronic device for use. In an embodiment, the button module 100 is disposed on a protective case of the electronic device and fits the electronic device for use. However, the disclosure is not limited thereto. In other embodiments, the button module 100 is directly mounted on the electronic device for use.

As shown in the figure, the button module 100 includes a base 120, a pressing part 140, and an elastic part 160. The base 120 includes a detection surface 122.

The detection surface 122 of the base 120 detects pressing force applied to the detection surface 122 by a user through the elastic part 160. A detection signal generated by the detection surface 122 is transmitted to the electronic device to generate a pressing feedback effect such as a vibration or a sound, so as to enrich game experience.

The pressing part 140 includes a fixed end 142 and a free end 144. The fixed end 142 is pivotally connected to the base 120 in a first axial direction A1. The free end 144 is disposed on the opposite side of the fixed end 142. The pressing part 140 is a component to which the user directly applies force when performing a pressing action.

The elastic part 160 is disposed on a side of the pressing part 140 facing the base 120, and is sandwiched between the pressing part 140 and the detection surface 122. The elastic part 160 improves the user's pressing feel and pushes the pressing part 140 back to its original position when the user ends a pressing action.

The elastic part 160 includes at least one first damping portion 162 and at least one second damping portion 164 (two first damping portions 162 and two second damping portions 164 are shown in the figure) selectively pressing against the detection surface 122 of the base 120. In this way, the user is allowed to toggle the elastic part 160 above the button module 100 to select the first damping portion 162 or the second damping portion 164 to press against the detection surface 122 of the base 120, so as to generate different pressing feel.

In an embodiment, assuming that the first damping portion 162 has a higher hardness than the second damping portion 164, under the same pressing force, when the user selects the first damping portion 162 to press against the detection surface 122, a rebound of a button is accelerated, and when the user selects the second damping portion 164, a pressing feedback effect of the electronic device is enhanced.

In an embodiment, the base 120 is provided with a pressure sensor (not shown) below the detection surface 122 to detect pressing force of the user. In an embodiment, the pressure sensor includes a diaphragm, and deformation that is caused when the user applies force to the diaphragm through the elastic part 160 is converted into a resistance or capacitance change to generate a detection signal.

In an embodiment, the base 120 is provided with an ultrasonic sensor (not shown) below the detection surface 122. The ultrasonic sensor includes a plurality of detection points distributed on the detection surface 122. These detection points detect a contact area between the elastic part 160 and the detection surface 122, so as to estimate the pressing force. Specifically, when the user applies larger pressing force, the deformation of the elastic part 160 is larger, and the contact area between the elastic part 160 and the detection surface 122 is larger. Conversely, when the user applies smaller pressing force, the contact area between the elastic part 160 and the detection surface 122 is smaller.

In an embodiment, as shown in FIG. 1A, the pressing part 140 includes an opening 146 aligned with the elastic part 160. The elastic part 160 is pivotally connected to the opening 146 of the pressing part 140 in a second axial direction A2, presenting a roller structure protruding upward from the opening 146. In this embodiment, the second axial direction A2 is perpendicular to the first axial direction A1, and is parallel to a direction of a long side direction of the pressing part 140.

In an embodiment, as shown in FIG. 1C, the elastic part 160 includes two first damping portions 162 and two second damping portions 164. The two first damping portions 162 are disposed on opposite sides of the elastic part 160 in a first direction (that is, a longitudinal direction in the figure), and the two second damping portions 164 are disposed on the opposite sides of the elastic part 160 in a second direction (that is, a transverse direction in the figure). The user toggles the elastic part 160 to rotate, so as to select the first damping portion 162 or the second damping portion 164 to press against the detection surface 122 of the base 120.

In an embodiment, as shown in FIG. 1C, the elastic part 160 further includes a partition 166. The partition 166 divides the elastic part 160 into a plurality of zones, and the first damping portion 162 and the second damping portion 164 are disposed in these zones. When the first damping portion 162 or the second damping portion 164 presses against the detection surface 122, the partition 166 presses against the pressing part 140, so as to facilitate effective transfer of the pressing force applied by the user to the pressing part 140 to the first damping portion 162 or the second damping portion 164.

In an embodiment, as shown in FIG. 1C, the partition 166 is divided into four zones in a cross structure. The two first damping portions 162 and the two second damping portions 164 are disposed in the four zones. The two first damping portions 162 are disposed in two opposing zones, and the two second damping portions 164 are disposed in two opposing areas.

The elastic part 160 in this embodiment is pivotally connected to the pressing part 140 in the second axial direction A2, and the second axial direction A2 is perpendicular to the first axial direction A1. In this case, a toggling direction of toggling the elastic part 160 to adjust pressing feel is perpendicular to the long side direction of the pressing part 140. However, the disclosure is not limited thereto. In other embodiments, the second axial direction A2 is also parallel to the first axial direction A1. In this case, the toggling direction of toggling the elastic part 160 to adjust the pressing feel is parallel to the long side direction of the pressing part 140.

The pressing part 140 is, in an embodiment, made of a metal material or a hard plastic material. The first damping portion 162 and the second damping portion 164 of the elastic part 160 are, in an embodiment, made of a soft plastic material such as silicone and rubber. The partition 166 is, in an embodiment, made of a hard plastic material.

The first damping portion 162 and the second damping portion 164 in this embodiment are made of different materials, so that the overall structure shows different Shore hardness, thereby adjusting pressure feel. However, the disclosure is not limited thereto.

Figure 2:
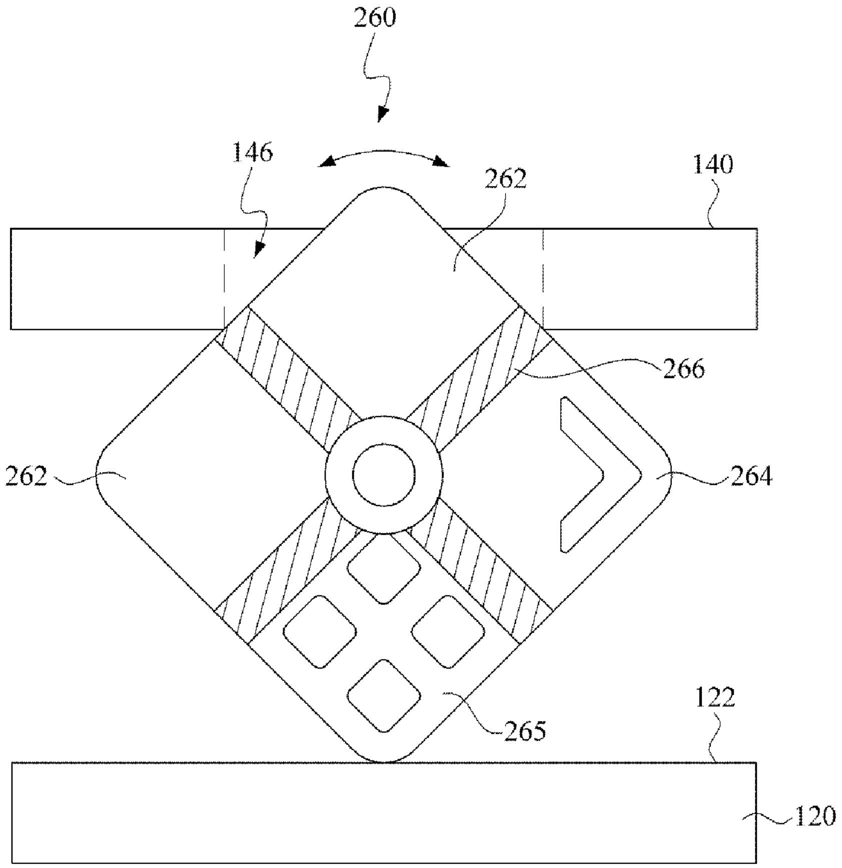
FIG. 2 is a schematic diagram of an elastic part according to a second embodiment of the disclosure.

In addition, FIG. 2 is a schematic diagram of an elastic part 260 according to a second embodiment of the disclosure. Compared with the elastic part 160 shown in FIG. 1C, the elastic part 260 in FIG. 2 includes two first damping portions 262, a second damping portion 264, a third damping portion 265, and a partition 266.

The first damping portion 262, the second damping portion 264, and the third damping portion 265 are made of the same material, but have different internal structures to show different hardness. In an embodiment, the first damping portion 262 is not provided with pores inside. The second damping portion 264 and the third damping portion 265 are both provided with pores inside, but have different porosity to present different hardness.

The user toggles the elastic part 260 to rotate, so as to select the first damping portion 262, the second damping portion 264 or the third damping portion 265 to press against the detection surface 122 of the base 120 to adjust different pressing feel.

Figure 3A:
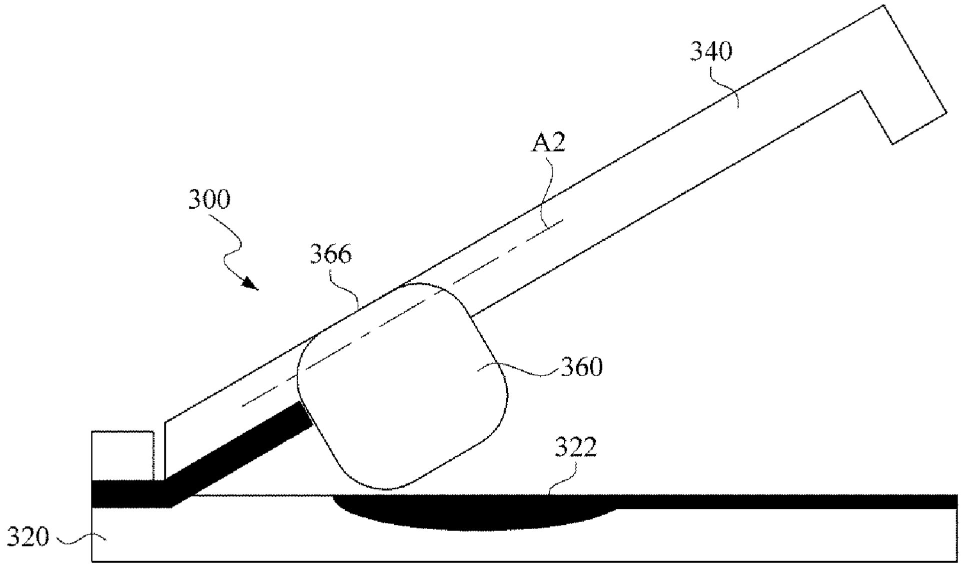
FIG. 3A to FIG. 3E show a button module according to a third embodiment of the disclosure.
Figure 3B:
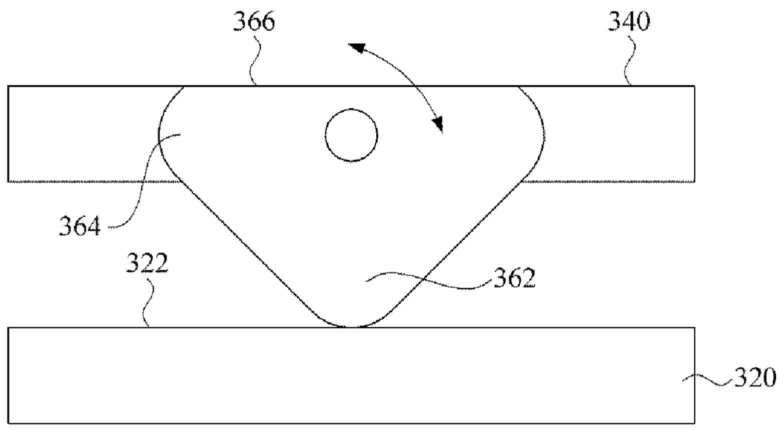
Figure 3C:
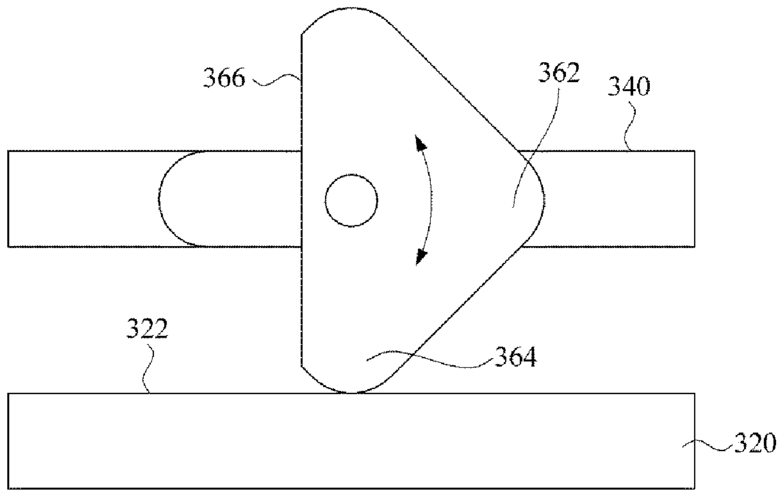
Figure 3D:
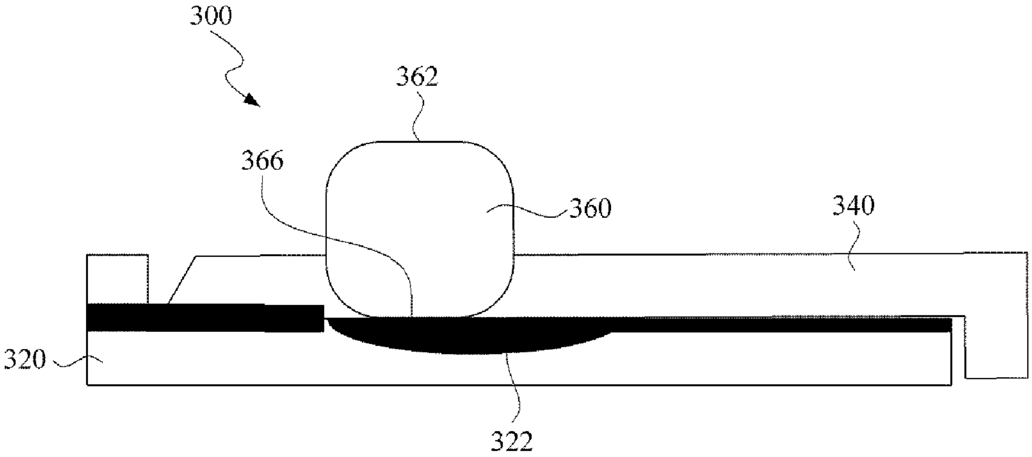
Figure 3E:
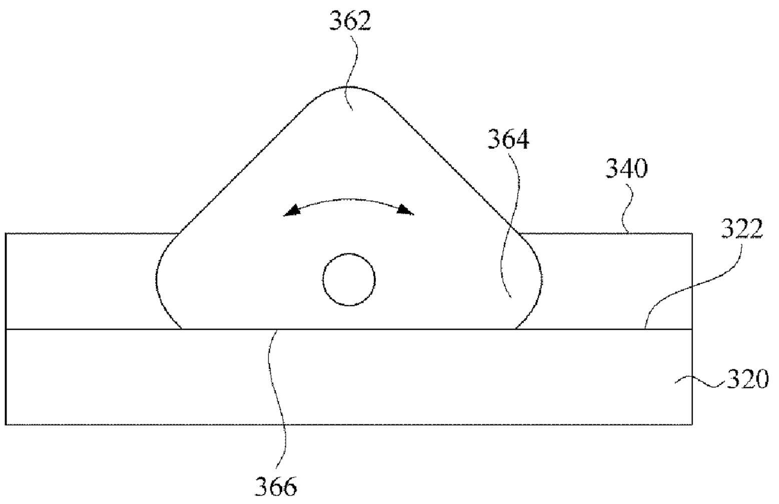

FIG. 3A to FIG. 3E show a button module 300 according to a third embodiment of the disclosure. FIG. 3A is a schematic side view of the button module 300 in a first use state, and FIG. 3B is a schematic front view of a corresponding elastic part 360. FIG. 3C is a schematic front view of the elastic part 360 corresponding to the button module 300 in a second use state. FIG. 3D is a schematic side view of the button module 300 in a folded state, and FIG. 3E is a schematic front view of the corresponding elastic part 360.

A main difference between the button module 300 in this embodiment and the button module 100 in the first embodiment of the disclosure lies in the elastic part 360. A base 320 and a pressing part 340 in this embodiment are similar to the base 120 and the pressing part 140 of the button module 100 provided in the first embodiment of the disclosure. Details are not described herein again.

Similar to the first embodiment of the disclosure, the elastic part 360 in this embodiment is pivotally connected to the pressing part 340 in the second axial direction A2. The second axial direction A2 is parallel to a long side direction of the pressing part 340. However, different from that the elastic part 160 in the first embodiment of the disclosure has a rotating shaft disposed at a central position of the elastic part 160, the elastic part 360 in this embodiment presents an eccentric roller structure.

As shown in the figure, the elastic part 360 includes a first damping portion 362 and a second damping portion 364 selectively pressing against a detection surface 322 of the base 320. The first damping portion 362 and the second damping portion 364 both present a hill-shaped structure, but angles of top angles of the first damping portion 362 and the second damping portion 364 are different. The first damping portion 362 presents a hill-shaped structure with a 90-degree angle, and the second damping portion 364 presents a hill-shaped structure with a 45-degree angle. In a case that the entire elastic part 360 is made of the same material, the first damping portion 362 with a larger top angle has a higher hardness than the second damping portion 364 with a smaller top angle. In this way, different pressing feel are adjusted.

In addition, the elastic part 360 in this embodiment includes a flat surface 366 on a side opposite to the first damping portion 362. The user rotates the elastic part 360 to enable the flat surface 366 to face the detection surface 322 of the base 320, so that the pressing part 340 is placed close to the base 320 to facilitate folding of the button module 300.

Figure 4A:
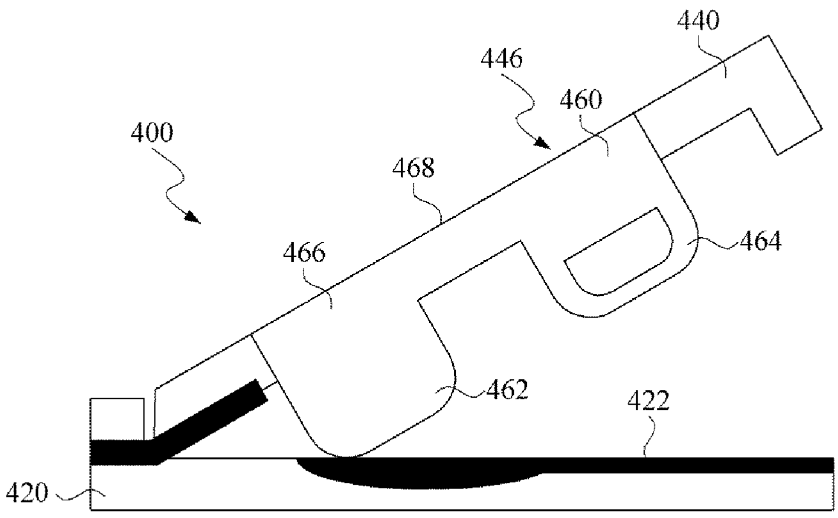
FIG. 4A to FIG. 4C show a button module according to a fourth embodiment of the disclosure.
Figure 4B:
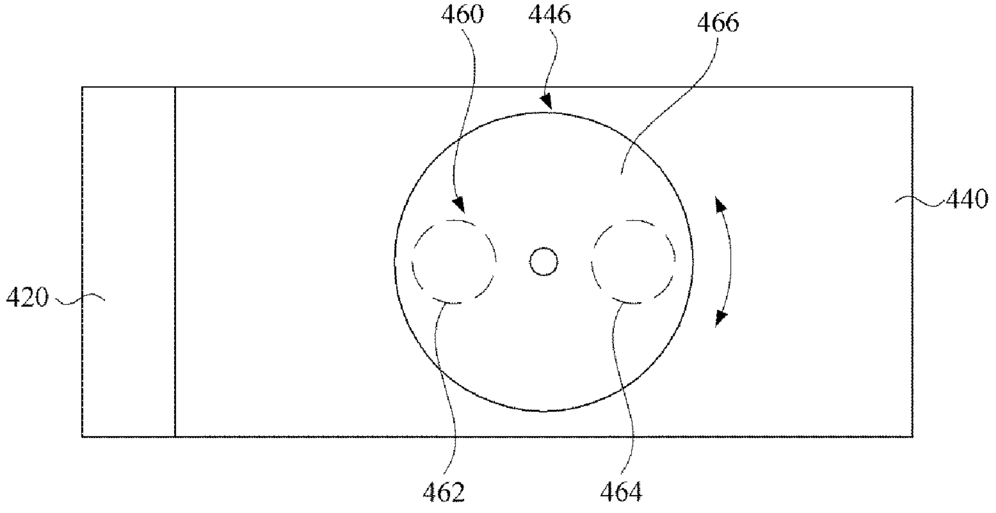
Figure 4C:
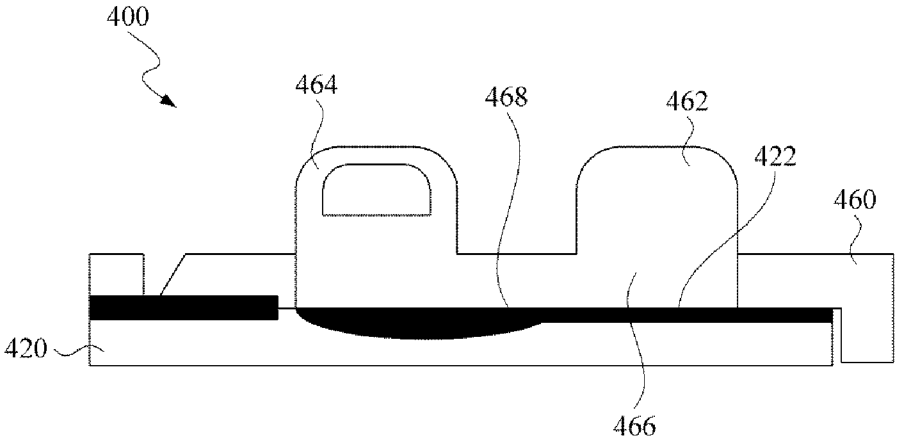

FIG. 4A to FIG. 4C show a button module 400 according to a fourth embodiment of the disclosure. FIG. 4A is a schematic side view of the button module 400 in a use state, FIG. 4B is a schematic top view of the button module 400 in the use state, and FIG. 4C is a schematic side view of the button module 400 in a folded state.

A main difference between the button module 400 in this embodiment and the button module 100 in the first embodiment of the disclosure lies in an elastic part 460. A base 420 and a pressing part 440 in this embodiment are respectively similar to the base 120 and the pressing part 140 of the button module 100 provided in the first embodiment of the disclosure. Details are not described herein again.

As shown in the figure, the elastic part 460 includes a first damping portion 462, a second damping portion 464, and a disc structure 466. The disc structure 466 is rotatably disposed in an opening 446 of the pressing part 440. The first damping portion 462 and the second damping portion 464 are disposed on a side of the disc structure 466 facing a detection surface 422, and protrude from the disc structure 466 toward the detection surface 422.

The second damping portion 464 is provided with a cavity inside, while the first damping portion 462 is not. In this way, the first damping portion 462 and the second damping portion 464 have different hardness on the whole. The disc structure 466 is rotated for the user to select the first damping portion 462 or the second damping portion 464 to press against the detection surface 422 of the base 420, to generate different pressing feel.

In addition, the disc structure 466 in this embodiment includes a flat surface 468 on a side opposite to the detection surface 422. As shown in FIG. 4C, the user flips the elastic part 460 to enable the flat surface 468 to face the detection surface 422 of the base 420, so that the pressing part 440 is placed close to the base 420, to facilitate folding of the button module 400.

Figure 5:
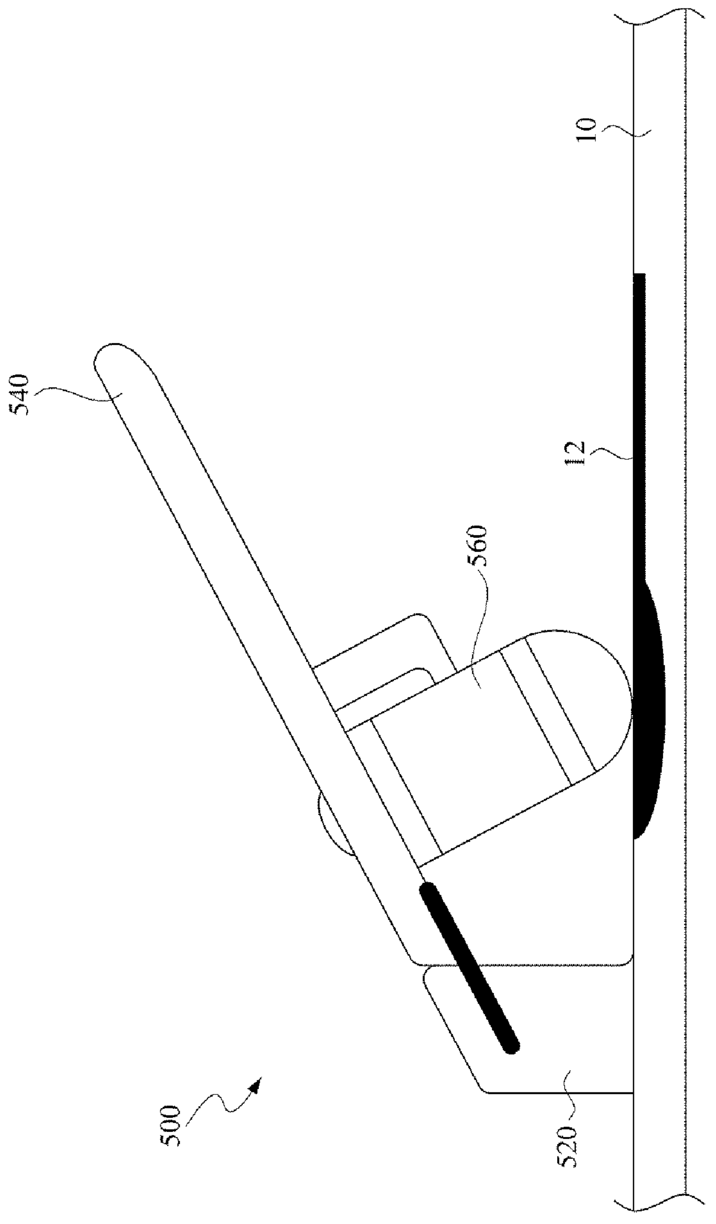
FIG. 5 is a schematic side view of a button module according to a fifth embodiment of the disclosure.

FIG. 5 is a schematic side view of a button module 500 according to a fifth embodiment of the disclosure.

The main difference between the button module 500 in this embodiment and the button module 100 in the first embodiment of the disclosure lies in a base 520. A pressing part 540 and an elastic part 560 of the button module 500 in this embodiment are respectively the same as the pressing part 140 and the elastic part 160 of the button module 100 provided in the first embodiment of the disclosure. Details are not described herein again.

The button module 100 in the first embodiment of the disclosure uses the detection surface 122 of the base 120 to detect a button pressing operation, while the base 520 of the button module 500 in this embodiment is used to fix the button module 500 on an electronic device 10, the elastic part 560 is disposed on a side of the pressing part 540 facing a detection surface of the electronic device 10, and an existing sensor 12 (such as a pressure sensor or an ultrasonic sensor) on the electronic device 10 is used as the detection surface to detect the button pressing operation. In this way, a physical button is disposed on the electronic device 10 that does not include physical buttons.

Figure 6:
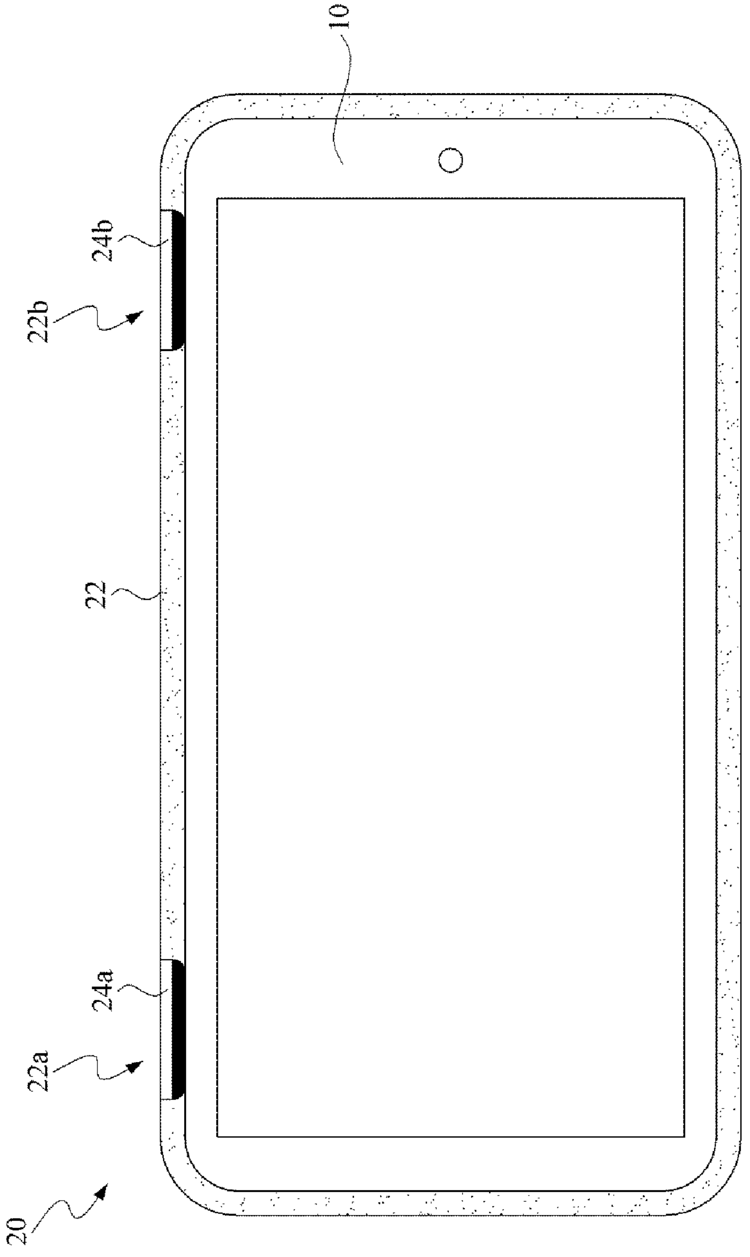
FIG. 6 is a schematic diagram showing a button module according to the disclosure being mounted on a protective case to fit an electronic device for use.

FIG. 6 is a schematic diagram showing a button module according to an embodiment of the disclosure being mounted on a protective case to fit an electronic device for use. A protective case 20 in the figure is a mobile phone protective case to fit a mobile phone for use. The button modules 100, 300, 400, 500 provided in the first to fifth embodiments of the disclosure are used as button modules 24*a*, 24*b* in the figure that are disposed on the protective case 20 to fit the electronic device 10 for use.

As shown in the figure, a side wall 22 on a long side of the protective case 20 is provided with two openings 22*a*, 22*b*, in which the button modules 24*a*, 24*b* are disposed respectively. These button modules 24*a*, 24*b* are directly aligned with a sensor of an electronic device (not shown) and used as physical buttons to fit the electronic device for use. An existing detection surface of the button modules 24*a*, 24*b* is used to detect a pressing operation. A detection signal generated by the button modules 24*a*, 24*b* is transmitted to the electronic device by using a connector such as a universal serial bus (USB) connector on the protective case 20.

The button modules 100, 300, 400, 500 provided in the disclosure respectively include pressing parts 140, 340, 440, 540 and elastic parts 160, 260, 360, 460, 560. The elastic parts 160, 260, 360, 460, 560 provide a user with pressing feel feedback, and detection surfaces 122, 322, 422 detect applied pressure to trigger an electronic device to generate different feedback. In this way, the button module provides more impressive game experience while satisfies a portability requirement.

In addition, the elastic parts 160, 260, 360, 460, 560 provided in the disclosure respectively include first damping portions 162, 262, 362, 462 and second damping portions 164, 264, 364, 464 with different hardness. A user is allowed to select the first damping portions 162, 262, 362, 462 or the second damping portions 164, 264, 364, 464 to press against the detection surfaces 122, 322, 422, so as to adjust required button feedback.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A button module, comprising:

a base, comprising a detection surface;

a pressing part, comprising a fixed end and a free end, the fixed end being pivotally connected to the base in a first axial direction; and an elastic part, disposed on a side of the pressing part facing the base, and comprising a first damping portion and a second damping portion selectively pressing against the detection surface, wherein a hardness of the first damping portion is different from a hardness of the second damping portion;

wherein the elastic part comprises a partition;

wherein the partition divides the elastic part into a plurality of zones, and the first damping portion and the second damping portion are disposed in the plurality of zones respectively.

2. The button module according to claim 1, wherein the first damping portion and the second damping portion are disposed on opposite sides of the partition.

3. The button module according to claim 1, wherein the elastic part is pivotally connected to the pressing part in a second axial direction.

4. The button module according to claim 3, wherein the first axial direction is perpendicular to the second axial direction.

5. The button module according to claim 3, wherein the first axial direction is parallel to the second axial direction.

6. The button module according to claim 1, wherein the pressing part comprises an opening, and the opening is aligned with the elastic part.

7. The button module according to claim 1, wherein the base comprises a pressure sensor, disposed on the detection surface.

8. The button module according to claim 1, wherein the base comprises an ultrasonic sensor, disposed on the detection surface.

9. The button module according to claim 1, wherein the first damping portion and the second damping portion are made of different materials.

10. The button module according to claim 1, wherein the first damping portion and the second damping portion have different structures.

11. The button module according to claim 1, wherein the first damping portion and the second damping portion have different porosity.

12. The button module according to claim 1, wherein the button module is disposed on a protective case.

13. A button module, mounted on an electronic device, wherein the electronic device comprises a detection surface, the button module comprising:

a base, configured to be fixed on a side of the detection surface;

a pressing part, comprising a fixed end and a free end, the fixed end being pivotally connected to the base in a first axial direction; and an elastic part, disposed on a side of the pressing part facing the detection surface, and comprising a first damping portion and a second damping portion selectively pressing against the detection surface, wherein a hardness of the first damping portion is different from a hardness of the second damping portion;

wherein the elastic part comprises a partition;

wherein the partition divides the elastic part into a plurality of zones, and the first damping portion and the second damping portion are disposed in the plurality of zones respectively.

* * * * *